C. LEVEY.
CAMERA FOCUSING ATTACHMENT.
APPLICATION FILED JAN. 27, 1910.

1,008,418.

Patented Nov. 14, 1911.
3 SHEETS—SHEET 1.

WITNESSES:
Nathan Rubenstein
Meyer Goldfarb

INVENTOR.
Charles Levey

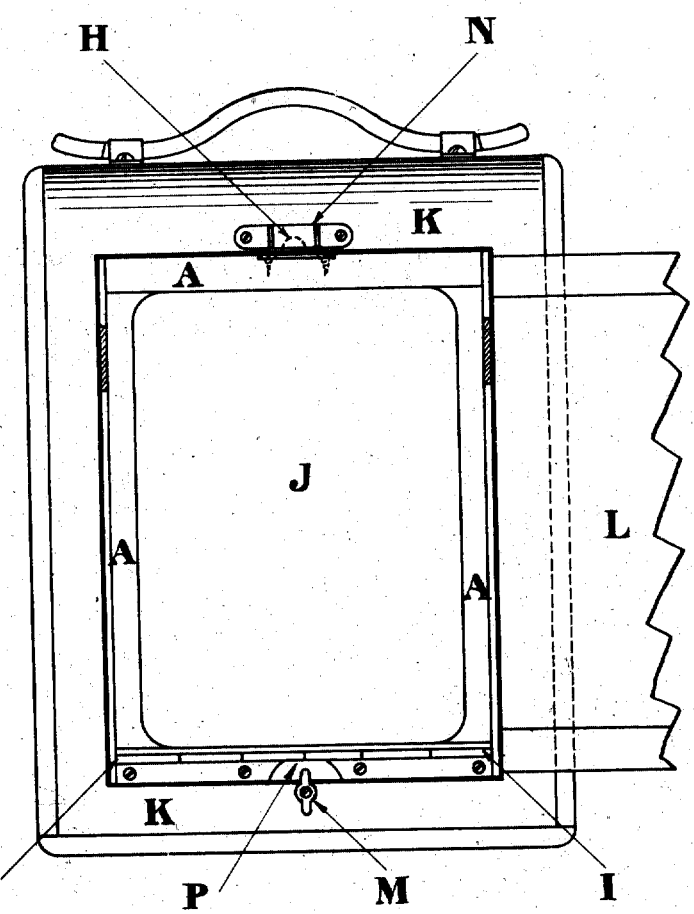

UNITED STATES PATENT OFFICE.

CHARLES LEVEY, OF ROCHESTER, NEW YORK, ASSIGNOR OF ONE-HALF TO ABRAHAM B. BLOOM, OF ROCHESTER, NEW YORK.

CAMERA-FOCUSING ATTACHMENT.

1,008,418.     Specification of Letters Patent.     Patented Nov. 14, 1911.

Application filed January 27, 1910. Serial No. 540,447.

*To all whom it may concern:*

Be it known that I, CHARLES LEVEY, a citizen of the United States of America, and a resident of Rochester, in the county of Monroe and State of New York, have invented certain new and useful Improvements in Camera-Focusing Attachments, of which the following is a specification.

The main object of this invention is to provide an improved form of focusing attachment for plate cameras, and an improved method of attaching it to a camera.

A specific embodiment of this invention is shown in the accompanying drawings, in which:—

Figures 1, 2:
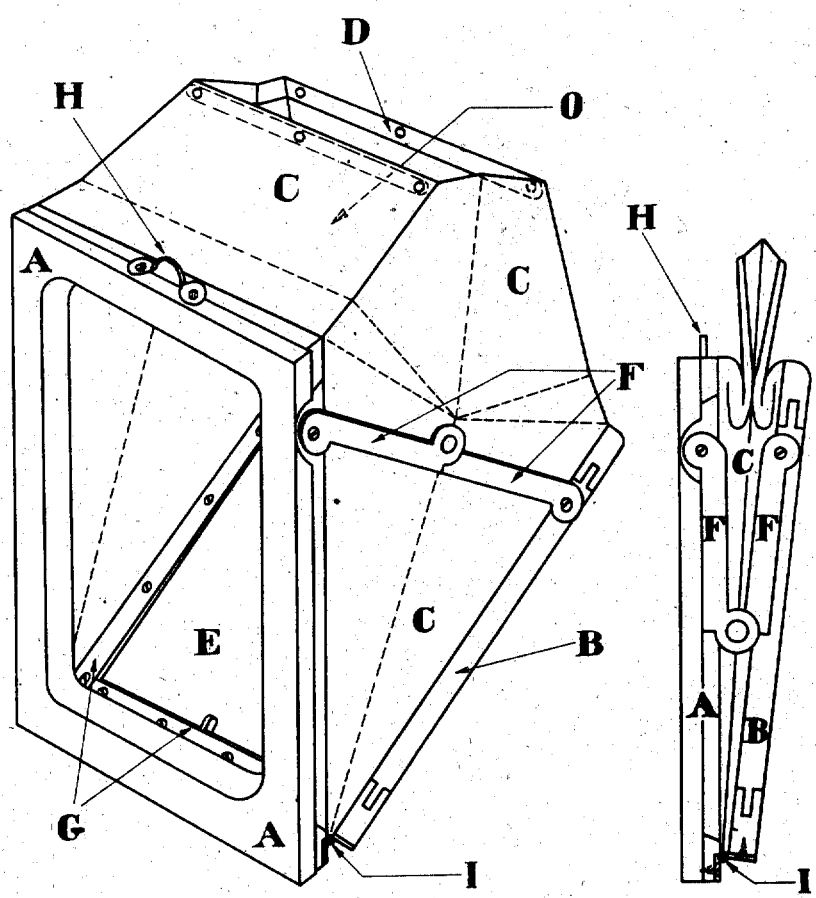
Figure 4:
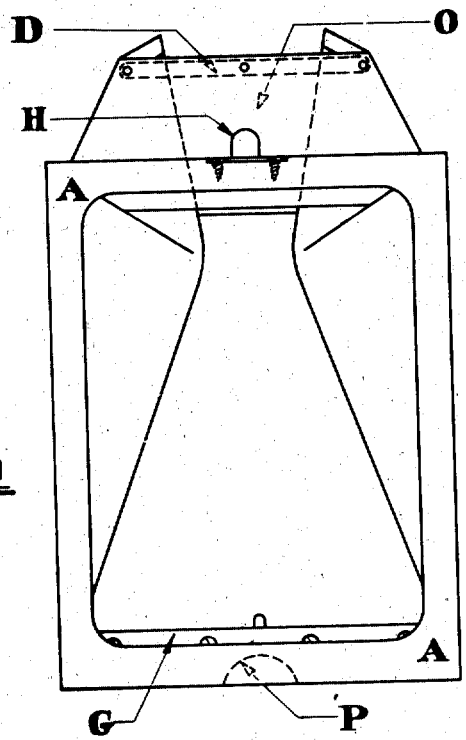
Figure 5:
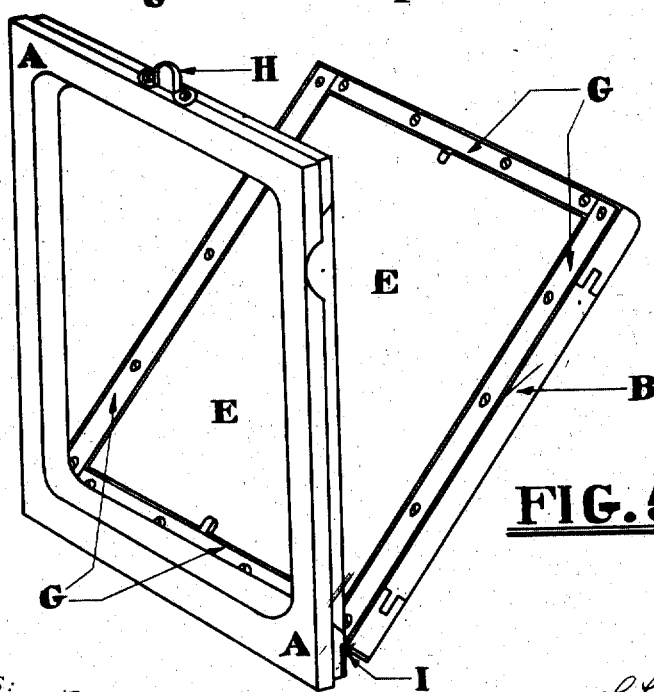

Figure 1 is a perspective view of a focusing attachment constructed according to this invention, the device being in open position. Fig. 2 is an end elevation of the same in the folded position. Fig. 3 is an end view of a camera with the front frame of the focusing apparatus in position thereon, the hood being omitted and the folding hinges being shown in section. Fig. 4 is a front view of the device in folded position. Fig. 5 is a perspective view, similar to Fig. 1, but with parts removed to illustrate structural details. Figs. 6 and 7 are details of small parts by means of which the device is held in position on the camera.

In the construction shown in the drawings, the apparatus comprises a frame A and back B, hinged together along one edge by the hinge I, and having the other edges connected to a flexible hood having collapsible sides C, which may be made of any suitable opaque fabric. The top of the hood is provided with an oblong sight opening O, along the front and back of which are stiffening strips D for maintaining the shape of the opening. The side edges of the opening O are not stiffened and are adapted to fold when the hood is collapsed. The edges of the sides C are clamped to the frames by means of metal strips G screwed thereto, which on the back B form a setting for the mirror E. The back B is adapted to be swung away from the frame A to an angle of about forty-five degrees, as limited by the folding links F, so as to be in the line of vision through the opening O, and so as to reflect the image and cause it to appear to the operator in its erect position. The frame A is constructed to fit within the opening K at the back of the camera when the door L is opened, and the face of the frame bears against the ground glass so as to prevent the leakage of light. A clip N is secured to the camera at one edge of the opening K and the frame A has a lug H adapted to engage the clip N. A button M is pivoted to the camera at the opposite edge of the opening K, and is adapted to be swung so that one end bears on the frame A at P for securing the apparatus to the camera in working position.

The operation of the device shown is as follows:—

To secure the focusing attachment in position, the door L at the back of the camera is opened, the lug H is inserted under the clip N at the top, and the button M is turned across the joint at the bottom. When the back B is now swung back to its open position as in Fig. 1, the operator may look into the opening O and see the image for directing the camera and making the focusing adjustments. When folded, the attachment lies close to the back of the camera in compact form, and is out of the way. The hood is so formed that it collapses to flat form and occupies minimum space, and no attention on the part of the operator is needed in opening or closing the attachment, beyond the simple act of swinging the back out or in, as the case may be, since the hood is creased so as to assume its expanded or collapsed position according to the relative position of the frame A and back B.

Although but one specific embodiment of this invention is herein shown and described, it will be understood that numerous details of the construction shown may be altered or omitted without departing from the spirit of this invention, as defined by the following claims.

I claim

1. A focusing device for cameras, comprising a front frame, a back hinged to said frame along the bottom, a flexible hood attached to said back and frame around their sides and top and having a sight opening in its top, the walls of said sight opening being protected by stiffening strips secured to the hood, and all of said parts being adapted to open and close said sight opening through the acts of swinging the back away from and toward said front frame.

2. The combination with a camera having a focusing screen and having an opening for exposing the focusing screen to view, of a frame adapted to fit within said opening, a back hinged at one edge to said frame, a clip on said camera, a lug on one edge of said frame adapted to engage said clip, a turn button on said camera adapted to engage the opposite edge of said frame, whereby said frame is held in contact with said ground screen, a mirror carried by said back, and a flexible hood connecting the edges of said frame and back and having a sight opening located in position for permitting a view of the image reflected by said mirror.

3. A focusing attachment for cameras, comprising a front frame, a back hinged to said frame along the bottom, a flexible hood attached to said back and frame around their sides and top and having a sight opening in its top, said sight opening being of oblong form and having its long axis parallel with said back, and said hood being foldable in planes parallel with said sight opening, whereby said frame will be opened and closed through the acts of swinging the back away from and toward said front frame.

CHARLES LEVEY

In presence of—
NATHAN RUBENSTEIN,
MEYER GOLDBLATT.

---

Copies of this patent may be obtained for five cents each, by addressing the "Commissioner of Patents. Washington, D. C."

Correction in Letters Patent No. 1,008,418.

It is hereby certified that in Letters Patent No. 1,008,418, granted November 14, 1911, upon the application of Charles Levey, of Rochester, New York, for an improvement in "Camera-Focusing Attachments," an error appears in the printed specification requiring correction as follows: Page 2, line 24, for the words "sight opening, whereby said frame will be" read *frame, whereby said sight opening will be;* and that the said Letters Patent should be read with this correction therein that the same may conform to the record of the case in the Patent Office.

Signed and sealed this 12th day of December, A. D., 1911.

[SEAL.]
E. B. MOORE,
*Commissioner of Patents.*